United States Patent [19]

Nishida et al.

[11] 4,234,251
[45] Nov. 18, 1980

[54] AUTOMATIC PICTURE MASKING DEVICE

[75] Inventors: Fumihiko Nishida, Kyoto; Hiroshi Ijiri, Nagaokakyo, both of Japan

[73] Assignee: Dainippon Screen Seizo Kabushiki Kaisha, Kyoto, Japan

[21] Appl. No.: 24,975

[22] Filed: Mar. 29, 1979

[30] Foreign Application Priority Data

Mar. 31, 1978 [JP] Japan ................................ 53-37836

[51] Int. Cl.³ ............................................. G03B 27/58
[52] U.S. Cl. ...................................... 355/74; 354/4
[58] Field of Search .................. 355/53, 74, 75; 354/4

[56] References Cited

U.S. PATENT DOCUMENTS

| 3,494,695 | 2/1970 | Sollima et al. ................. 355/53 X |
| 3,737,227 | 6/1973 | Harter et al. ................. 355/74 |
| 4,135,810 | 1/1979 | Walter ................. 355/74 X |

Primary Examiner—Richard A. Wintercorn
Attorney, Agent, or Firm—Lackenbach, Lilling & Siegel

[57] ABSTRACT

An automatic masking device for use in a composer, wherein an original picture is held against a transparent plate, which comprises a plurality of opaque masking-sheets which are adapted to move inwards along the surface of the transparent plate from its edges, driven by drive means which is controlled by detectors which are mounted on the inside edges of at least some of the masking sheets.

7 Claims, 7 Drawing Figures

AUTOMATIC PICTURE MASKING DEVICE

BACKGROUND OF THE INVENTION

This invention relates to an automatic masking device for an original picture holder used in a composer for printing repeatedly original pictures onto a photosensitive material such as a film, a plate, or the like.

An original picture to be held on an original picture holder is usually smaller than the entire effective surface of the original picture holder, and accordingly the part of the original picture holder surrounding the original picture is usually masked off.

FIGS. 1(a), 1(b), 2 and 3 of the drawings show the general layout of a prior art original picture holder. The original picture, which comprises a pattern 2 and register marks 3 around it, is shown in FIG. 1a. This is attached to an original picture holder, and is contact-printed onto a photosensitive material, a cut mask 4 having transparent portions in it being laid on the original picture 1 so as to mask off its periphery. The transparent portions correspond to the pattern 2 and the register marks 3. This cut mask 4 is shown in FIG. 1b.

The manner of doing this is as follows. The original picture 1, as shown in FIGS. 2 and 3, is positioned and attached in a central position on one side of a transparent mounting sheet 5 so that its base surface contacts therewith. The cut mask 4 is attached onto the opposite surface of the transparent mount sheet 5, in a position corresponding to that of the original picture 1, and the assembly thus formed is held onto the contact surface 6a of a transparent plate 6 by a vacuum suction means or the like.

Then, this original picture holder is positioned on the photosensitive material so as to contact the original picture 1 with the photosensitive material, and the pattern of the original picture is printed by light directed onto it through the transparent plate 6 onto the photosensitive material.

In FIGS. 2 and 3, the numeral 7 denotes masking means for masking off an unnecessary register mark 3 when the pattern 2 is printed, which is arranged on the opposite surface of the transparent plate 6 from the contact surface 6a, and is slidably moved.

As the automation of the other parts of the composer has become more and more advanced, along with the surrounding devices which are used with the composer, and automatic exchange of original pictures and printing plates has become possible, a fully automatic composer which might operate for a long time without operator attention has been envisaged. For this, automatic masking would be necessary.

Recently an automatic masking device has been developed, in which the pattern size and so forth of the original picture to be photo-composed are written on a control tape of a NC control machine, a computer, or the like, which automatically controls the actions of the composer for a long time, and the effective exposure surface of the original picture holder is varied by the control tape. However, this form of automatic masking is time-consuming, costly, and unsatisfactory: the information for driving the automatic masking device must be written on the control tape, etc., beforehand. Therefore, a simpler form of automatic masking has been desired.

SUMMARY OF THE INVENTION

Therefore, it is an object of the present invention to provide an automatic masking device for an original picture holder of a composer, free from the aforementioned defects, wherein there is no need to write information for driving the masking device according to the size of the original picture onto any memory means, wherein unwanted portions of the original picture are automatically masked off, and which is operable simply and reliably.

According to the present invention, there is provided, in a composer which comprises an original picture holder which comprises a transparent plate against which an original picture is to be held during use of the composer, an automatic masking device comprising a plurality of opaque masking sheets which are adapted to move inwards along the surface of the transparent plate, drive means for moving these masking sheets, and a plurality of detectors, mounted approximately on the inside edges of at least some of the masking sheets, and which control the drive means.

BRIEF DESCRIPTION OF THE DRAWINGS

The present invention will become more clearly understood from the following description of a preferred embodiment, taken in conjuction with the accompanying drawings. It should be understood, however, that the embodiment and the drawings are given only for the purpose of description, and are not intended to be in any way limitative of the present invention, or of the scope of protection desired. In the drawings, like parts are throughout denoted by the same reference numbers.

DESCRIPTION OF THE PREFERRED EMBODIMENT

Figure 1A:
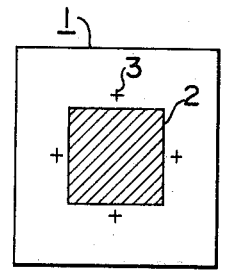
FIGS. 1(a) and 1(b) are top views of a conventional original picture and of a top mask, respectively.
Figure 1B:
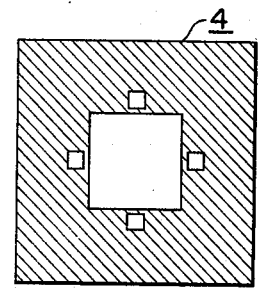
Figure 2:
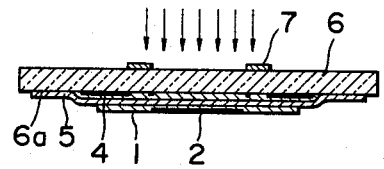
FIG. 2 is a fragmentary longitudinal cross-section of a conventional original picture holder for printing by using a conventional cut mask.
Figure 3:
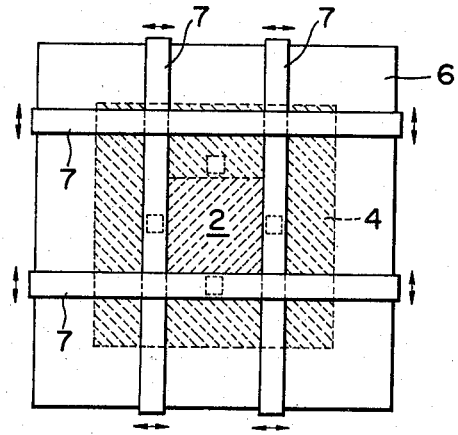
FIG. 3 is a top view of FIG. 2.
Figure 4:
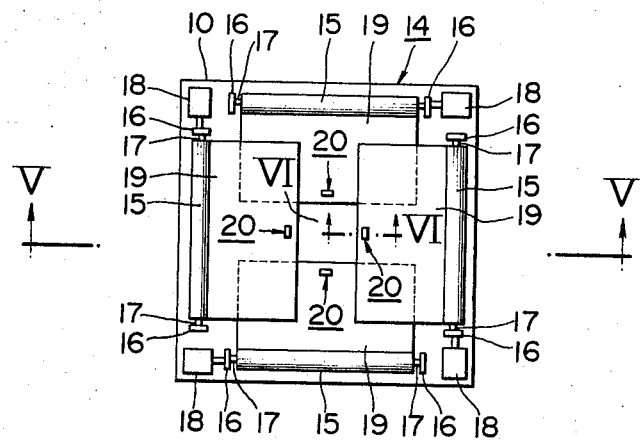
FIG. 4 is a fragmentary top view of an original picture holder including an automatic masking device according to the present invention.
Figure 5:
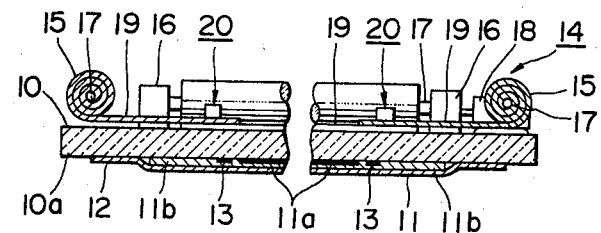
FIG. 5 is an enlarged longitudinal cross-section, taken along the line V—V in FIG. 4.

Referring to FIGS. 4 and 5, there is shown a transparent plate 10 of an original picture holder according to the present invention, which is square in form, and is made of glass, the lower surface of which forms a contact surface 10a on which an original picture is attached.

This is done by attaching a flexible transparent sheet 12, on which the original picture 11 is attached to the central upper surface, to the contact surface 10a by means of a vacuum suction means, or the like.

This original picture comprises a central patterned portion 11a and a border portion 11b having no pattern.

Four pieces of adhesive tape 13, for register marks, are attached to the border portion 11b, adjacent to the pattern portion 11a, of the original picture 11.

An automatic masking device according to the present invention comprises four masking units 15 arranged on the four sides of the square transparent plate 10. Each of these masking units comprises a roll shaft 17 parallel to the side of the transparent plate, which is supported by a pair of bearings 16, a reversible motor 18 for driving the roll shaft 17, a flexible opaque masking sheet 19 rolled on the roll shaft 17, which is adapted to extend as far as the center of the transparent plate 16, and a detector 20 fixed to the free end of the masking sheet 19.

As may be seen in FIG. 4, each masking sheet 19 may be advanced over the surface of the transparent plate 10 separately and independently, and they overlap one another without substantially disturbing their flat lying position against this surface. Thus, by suitably operating the motors 18, any desired rectangle with sides parallel to the sides of the plate 10 can be left uncovered, the rest of the plate 10 being blanked off or masked.

These masking sheets 19 may be made of rubber sheet, polyethylene glycol terephthalate film sheet, metallic foil, or the like.

Figure 6:
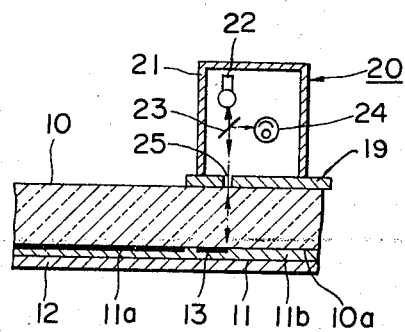
FIG. 6 is an enlarged longitudinal cross-section, taken along the line VI—VI in FIG. 4.

The detector 20, as clearly shown in FIG. 6, comprises a housing 21 fixed on the masking sheet 19, a light source 22 arranged in the housing 21, a half-mirror 23, and a photoelectric converter element 24.

The light source 22 is positioned just above the slit 25 formed in the masking sheet 19, and the half mirror 23 is arranged between the light source 22 and the slit 25 so that light which comes upwards through the slit 25 and is reflected by the half mirror 23 may be incident to the photoelectric converter element 24.

Thus light from the light source 22 is projected to the original picture 11 through the half mirror 23 and the slit 25 and, if any is reflected from the original picture 11, i.e. from a non-tranparent portion thereof, it will be reflected by the half mirror 23 onto the photoelectric element 24.

An electric circuit, which is not shown since it is of conventional construction, is arranged to stop the operation of the driving motor 18, when the amount of reflected light is greater than a certain threshold level. This means that the edge of the adhesive tape 13 has passed under the detector.

As an alternative, it would be possible to arrange for the controlling electric circuit to stop the motor 18 when the amount of reflected light changes suddenly by more than a certain rate of change. Each of these control methods has its advantages and drawbacks.

If, therefore, it is arranged that the distance from the free end of each masking sheet 19 to the slit 25 of the detector 20 mounted on that masking sheet is the same as that from the edge of the pattern portion 11a of the original picture 11 to the outer edge of the adhesive tape 13, then when the slit 24 is stopped at the outer edge of the adhesive tape 13 the free end of the masking sheet 19 will also stop at the edge of the pattern portion 11a.

The operation of the device according to the present invention will now be described.

The adhesive tapes 13 are properly attached to the original picture 11, and the original picture is attached to the transparent sheet 12. These are then held to the contact surface 10a of the transparent plate 10 by a vacuum suction means or the like. The masking sheets 19 are rolled back to their starting positions, fully rolled up on their roll shafts 17, by reversely driving the motors 18. Then, each of the motors 18 is driven forwards, under the control of the detector element attached to the masking sheet 19 which is being driven by that motor, so that the masking sheets 19 advance across the surface of the transparent plate 10, each until its free end reaches the edge of the pattern portion 11a of the original picture 11, when it is automatically stopped by its detector. Thus the border portion of the original picture 11 is masked off automatically.

The above description has covered an embodiment of the present invention wherein four rollers and masking sheets which are independently controlled by four detectors are provided. This is the most general form. However, other possibilities also exist.

For example, if it is assumed that the original picture 11 is positioned centrally in the transparent plate 10, then each pair of opposing masking units 15 could be provided with but one driving motor 18, and also with only one detector 20 controlling that driving motor 18, which is mounted on one of the masking sheets 19.

As another alternative, if it is assumed that the original picture 11 is positioned in one corner of the transparent plate 10, then there need be provided only two masking units 15, which regulate the positions of two of the sides, only, of the unmasked rectangle.

As a further modification, it would be quite possible for the adhesive tapes 13 to be omitted, and for the edges of the pattern portion 11a to be detected directly by the detectors 20. Or other marks, not tapes, but for instance crayon marks, might be detected. It would be even possible for the detectors to be not optical, but, for example, magnetosensitive, and for them to detect magnetic tapes or marks made on the original picture.

As a yet further possibility, several detectors could be provided at different places on one or more of the masking sheets, and used alternatively, or even in combination, so as to be able to stop the masking sheets in different alternative places, for example in order to print a register mark on the photosensitive material.

Although the present invention has been shown and described with reference to several preferred embodiments thereof, it should be understood that various changes of the form and content thereof can be made by one skilled in the art without departing from the scope of the invention, which is not intended to be limited by any of the details of the embodiments used for illustration, or of the drawings, but, along with the monopoly granted, is intended to be defined solely by the accompanying claims.

What is claimed is:

1. In a composer having an original picture holder which includes a transparent plate against which an original picture and masking register marks are to be held during the use of the composer, an automatic masking device comprising a plurality of opaque masking sheets each being adapted to move along the surface of the transparent plate to selective masking positions of the original picture; drive means for moving said masking sheets; and a plurality of detectors mounted on at least some of said masking sheets for controlling said drive means, each detector including means for directing light at and for detecting light reflected from said register marks.

2. A device according to claim 1, wherein exactly four masking sheets are provided, which each is provided with a detector and a drive means which is independently controlled by that detector.

3. A device according to claim 1, wherein exactly four masking sheets are provided, and exactly two drive means are provided, each of which controls two of the masking sheets which move in opposite directions, and which is controlled by a detector mounted on one of these two masking sheets.

4. A device according to claim 1, wherein exactly two masking sheets are provided, each of which is controlled by an independent drive means which is controlled by a detector mounted on its driven masking sheet.

5. A device according to any of claims 2, 3 or 4 wherein at least one of the masking sheets is provided with a plurality of detectors, which may alternatively be used for controlling the drive means.

6. In a composer as defined in claim 1, wherein each opaque masking sheet has an inside edge which is movable to produce variable masking of the original picture, and said detectors being mounted proximate said inside edges.

7. In a composer as defined in claim 1, wherein said opaque masking sheets each have a slit therein, each detector comprising a housing; a light source positioned just above said slit; a half mirror arranged between said light source and said slit; and a photoelectric converting element on which the light reflected from said register marks by said half mirror is incident.

* * * * *